May 11, 1948. P. F. BECHBERGER 2,441,182
AILERON AND ELEVATOR INDICATOR
Filed April 18, 1945 2 Sheets-Sheet 1
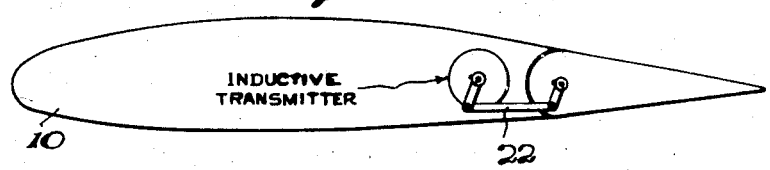
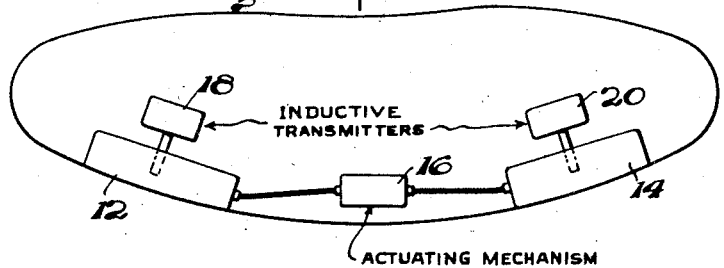
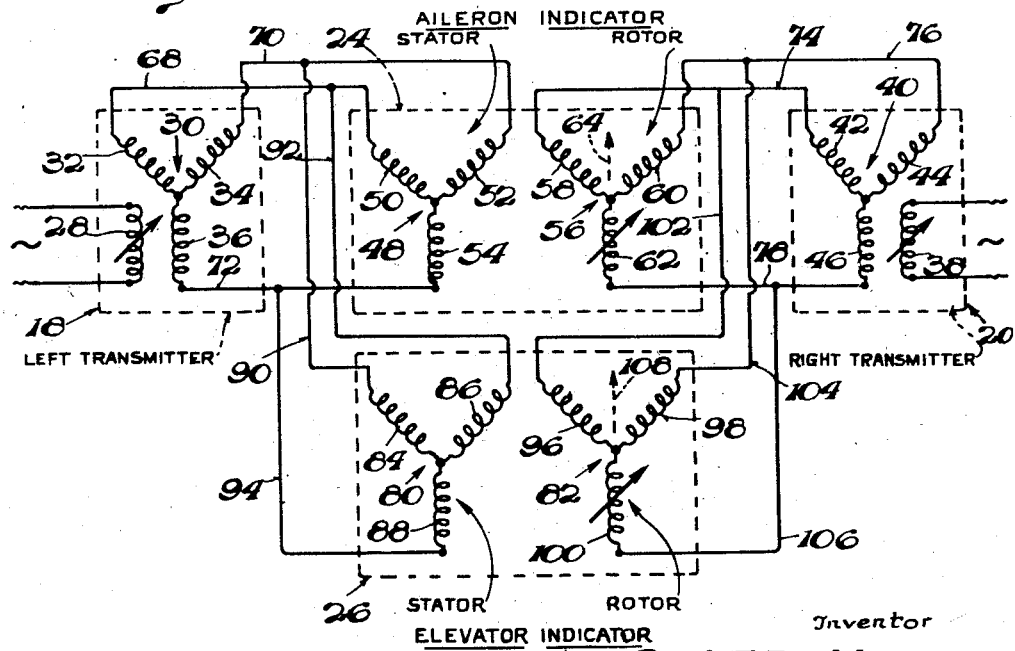
Inventor
Paul F. Bechberger.
By J. Talman
ATTORNEY May 11, 1948.  P. F. BECHBERGER  2,441,182
AILERON AND ELEVATOR INDICATOR
Filed April 18, 1945  2 Sheets-Sheet 2

Inventor
Paul F. Bechberger
By O. J. Talman
ATTORNEY

Patented May 11, 1948

2,441,182

UNITED STATES PATENT OFFICE 2,441,182

AILERON AND ELEVATOR INDICATOR

Paul F. Bechberger, Tenafly, N. J., assignor to Bendix Aviation Corporation, Teterboro, N. J., a corporation of Delaware Application April 18, 1945, Serial No. 589,044

8 Claims. (Cl. 177—351)

This invention relates to indicating apparatus and more particularly to a mechanism for remotely indicating the differential and average positions of two members which are capable of movement together or movement differentially. While not limited thereto, the invention is primarily directed to a system for indicating the differential and average positions of the wing flaps of an aircraft in order to enable the pilot to readily ascertain at all times, the relative position of the flaps and hence the trim or attitude of the craft.

In certain types of aircraft heretofore proposed, the flaps which are positioned at the trailing edge of the wing have been so mounted that they are capable of differential movement in opposite directions for banking the craft during a turn, and also capable of combined and equal movement in the same direction for nosing the craft up or down for changing attitude. In the first instance, the flaps function as ailerons and in the second, as elevators. These movements have been so coordinated that all necessary maneuvering of the craft has been accomplished by variably controlling the flaps to secure various combinations of the positions thereof.

It is highly desirable in such cases to indicate to the pilot, the condition of the flaps at all times, and it is accordingly one of the primary objects of the present invention to provide a novel indicating system which is so arranged as to inform the pilot as to the differential and average position of the flaps in all positions of adjustment.

A further object of the invention resides in providing a novel indicating system of the above type which includes a pair of indicators, one arranged to show differential movement of the flaps for aileron indication, and the other to show average position of the flaps for elevator indication.

Another object resides in the provision of an indicating system of the above type which includes a novel arrangement including electrical transmitting and receiving devices, whereby all mechanical connections between the flaps and indicators are entirely eliminated.

Still another object comprises a novel electrical telemetric system including a pair of movable members arranged to move in the same or opposite directions, together with means for separately indicating the two movements, so that the observer may be readily apprised of the average or mean position of the members as respects a neutral position, and also the average or mean of the differential movement between the members.

A still further object resides in providing a novel telemetric indicating system of the foregoing type which is especially adaptable for use in connection with the flying wing type of aircraft and which is relatively simple in construction.

Other objects and novel features of the invention will appear more fully hereinafter from the following detailed description when taken in connection with the accompanying drawings which illustrate one form of the invention. It is to be expressly understood, however, that the drawings are utilized for purposes of illustration only and are not designed as a definition of the limits of the invention, reference being had for this purpose to the appended claims.

In the drawings, wherein similar reference characters refer to like parts throughout the several views;

Fig. 1 is a diagrammatic transverse view of an aircraft wing incorporating the features of the present invention;

Fig. 2 is a diagrammatic plan view of the wing of Fig. 1;

Fig. 3 is a wiring diagram of the telemetric system for indicating the various positions of the wing flaps;

Figure 4:
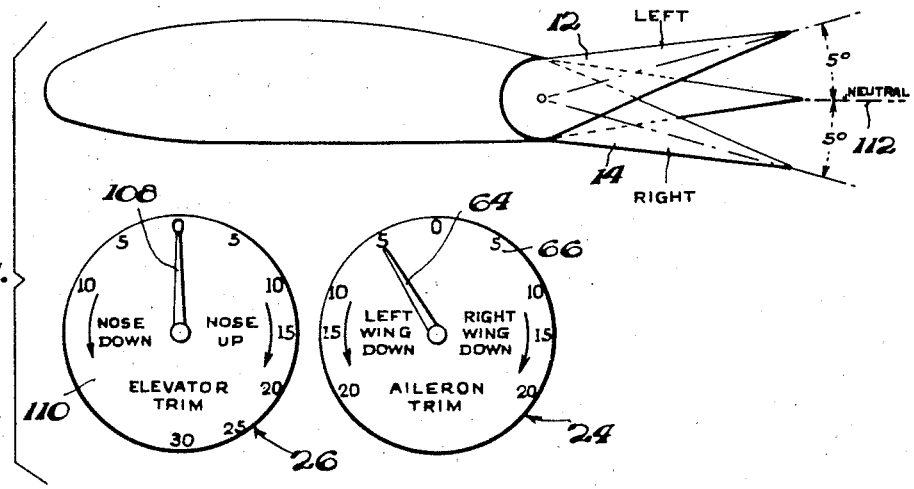
Fig. 4 is a diagrammatic view of the wing flaps and indicators in one position of adjustment.

Referring more particularly to Figs. 1 and 2, the present invention is illustrated therein as being associated with an aircraft wing 10 having left and right trim or wing flaps 12 and 14 respectively, each of these flaps being controllable by the pilot in such a manner that they may be moved in the same or opposite directions. Any suitable actuating mechanism 16 may be provided for effecting the movement of the wing flaps, it being understood that when the flaps are moved in the same direction, the craft noses up or down, and that when the flaps are moved differentially or in opposite directions, the craft turns or banks. In the first instance, the flaps function as elevators and in the second, as ailerons, and it will be understood that the wing may be supplemented by the usual fuselage and tail empennage or may be of the flying wing type of craft, the present invention being concerned primarily with the wing flap system.

Novel means are provided by the present invention for remotely indicating the various positions of the wing flaps as regards their aileron and elevator functions. In the form shown, such means comprises an electrical telemetric system and includes left and right inductive transmitters 18 and 20, the rotors of which are mechanically actuated by movements of the respective flaps 12 and 14 as by means of a system of links 22. Each of the transmitters 18 and 20 are interrelated, by a telemetric system, to be later described, with a pair of aileron and elevator indicators 24 and 26, Figs. 3, 4 and 5, the construction being such that the latter indicate to the pilot, the aileron and elevator functions of the wing flaps as they are moved to their various positions, thus showing the trim of the craft under all flight conditions.

In order to provide the aforementioned interrelation, the left transmitter 18 comprises a wound rotor 28, drivably connected with the left wing flap 12 through linkage 22, and inductively related to a three phase stator 30, having windings 32, 34 and 36 connected in Y-relation. Similarly, the right transmitter 20 includes a wound rotor 38, drivably connected with the right wing flap through linkage 22, and inductively associated with a three phase stator 40 having windings 42, 44 and 46 connected in Y-relation. The aileron indicator 24 includes a stator 48 having Y-connected windings 50, 52 and 54, and a rotor 56 comprising windings 58, 60 and 62 associated in Y-relation, it being pointed out that the stator 48 and rotor 56 are inductively related and that the latter is provided with a pointer 64 adapted to cooperate with a suitable instrument scale 66 having indicia thereon to indicate differential movement of the wing flaps in opposite senses. It will be observed that the respective windings of the stators 30 and 48 are associated in similar phase relation as by means of connections 68, 70 and 72 which respectively connect the windings 32 and 50, 34 and 52 and 36, 54. Also the respective windings of the stator 40 and rotor 56 are associated in similar phase relation as by connections 74, 76 and 78 which respectively connect the windings 42 and 58, 44 and 60 and 46, 62.

For the purpose of providing elevator indication of the flaps, the elevator indicator 26 includes inductively related stator and rotor windings 80 and 82 which are respectively associated with the left and right transmitters 18 and 20 in a novel manner. As shown, the stator 80 comprises Y-connected windings 84, 86 and 88 which are respectively associated with the windings 34, 32 and 36 of the stator 30 of the left transmitter 18 as by means of connections 90, 92 and 94, it being observed that the latter are such that the windings 84 and 86 are connected in the system in reverse phase relation. Rotor 82, likewise comprises Y-connected windings 96, 98 and 100 which are respectively associated with the windings 42, 44 and 46 of the stator 40 of the right transmitter 20 as by means of connections 102, 104 and 106, and in this case, it will be seen that the windings of the rotor 82 are connected in phase with the windings of the stator 40. As in the case of the aileron indicator, the rotor 82 of the elevator indicator 26 is provided with a suitable pointer 108 which cooperates with an instrument scale 110 having indicia thereon to indicate the elevator function of the movement of the flaps, Figures 3, 4 and 5.

In operation, with the rotor windings 28 and 38 of the left and right transmitters connected with a suitable source of alternating current, in the event that the right and left flaps 12 and 14 occupy the neutral position 112, as shown in Fig. 4, both indicators 24 and 26 will read zero and show that there is neither elevator nor aileron trim. Assuming that the left and right flaps 12 and 14 are respectively moved upwardly and downwardly through a distance equal to five degrees departure from the neutral position, it will be manifest that the aileron trim or differential movement would be five degrees or half the angle between the flaps and the indicator 24 should show that the left wing is down, the right wing is up, and that the craft is banking to the left. Under these conditions, and assuming that upward movement of the left flap 12 causes counterclockwise movement of the rotor 28, such movement of the latter will vary the phase relationship between the rotor 28 and stator 30 in such manner that the voltages induced in the latter and the resultant flux vector will be varied proportionately to the angular movement of the rotor. Such change in the direction of the resultant flux vector will be reproduced in the stator 48 and the aileron indicator 24, in view of the fact that said stator and the stator 30 are connected in phase. Thus, the resultant flux vector in the stator 48 may be considered to be angularly displaced in a counterclockwise direction, an amount equal to the angular displacement of the rotor 28 and hence the left flap 12. The same conditions will prevail as to the resultant flux vector in the rotor 56 of the aileron indicator 24 except that the displacement will occur in a clockwise direction due to the clockwise movement of the rotor 38 in response to the downward movement of the right flap 14.

During the above-described changes in the flux vector relationships an effective torque will be created between the inductively related stator 48 and the rotor 56 of the aileron indicator 24 which is of such a nature as to cause counterclockwise movement of the rotor 56 through half the angle of the differential movement between the flaps. Thus, the pointer 64 will move counterclockwise over the scale 66 and will indicate a five degree aileron trim to the left, as viewed in Figure 4. Obviously, if the positions of the flaps 12 and 14 had been reversed, the above-mentioned flux vector relationships and resultant torque would have been reversed and the reading on the scale 24 would have shown a five degree aileron trim to the right.

In considering the operation of the elevator indicator under the above conditions, it will be understood that in view of the fact that the stator 80 of the indicator 26 is reversed in phase, as respects the stator 30, the resultant flux vector present in the stator 80 due to the change in induced voltage during upward movement of the flap 12, will be displaced clockwise in the stator 80. Since rotor 82 is connected in phase with the stator 40, the resultant flux vector present in the rotor 82 will also be displaced clockwise and such angle of displacement will be equal to that of the resultant flux vector present in the stator 80, under the conditions assumed. Hence, no effective torque will be created by such resultant flux vectors and the pointer connected with the rotor 82 of the elevator indicator 26 will indicate zero, showing that there is a complete absence of elevator trim of the craft.

Figure 5:
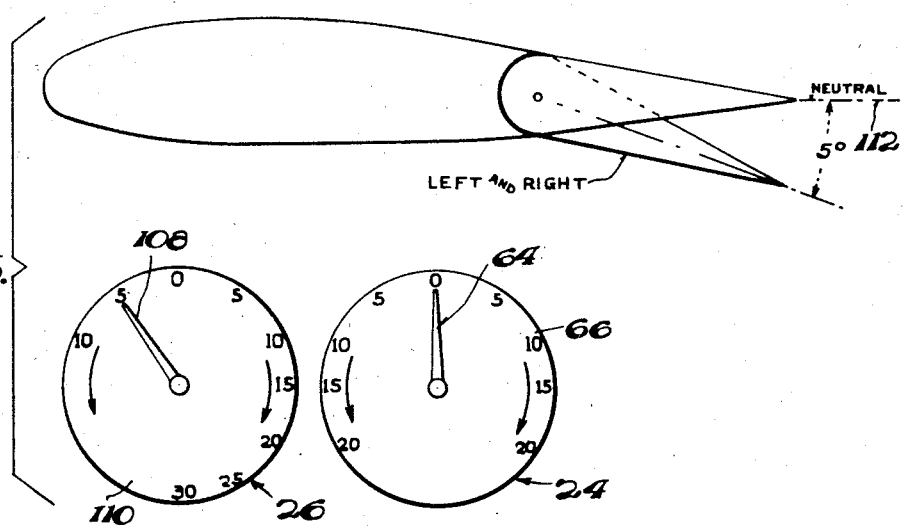
Fig. 5 is a diagrammatic view of the wing flaps and indicators in another position of adjustment.

Referring to Fig. 5 a different condition of flap position is illustrated therein, wherein both left and right flaps have been moved downwardly through an angular displacement of five degrees from the neutral position 112. Under these conditions the aileron indicator should read zero aileron trim while the elevator indicator should show a five degree elevator trim. During downward movement of the left flap 12, Fig. 3, it will be obvious that clockwise movement of the rotor 28 will cause a corresponding clockwise movement of the resultant flux vector present in the stator 48 caused by the variation in voltages induced in the stator 30. Downward movement of the right flap 14 will also cause a clockwise movement of the rotor 38 and a consequent clockwise displacement of the resultant flux vector present in the rotor 56 of the aileron indicator 24. Since the angular displacement of the resultant flux vectors present in the inductively related stator 48 and rotor 56 will be the same, no effective torque will be produced, and under these conditions the pointer 64 will indicate zero aileron trim on the scale 66.

On the other hand, the resultant flux vector present in stator 80 of the elevator indicator 26, will be displaced in a counterclockwise direction, due to the reversed phase relationship of the stator 80 with respect to the stator 30. Since rotor 82 is in phase with the stator 40 of the right transmitter 20, the resultant flux vector present in the rotor 82, due to the downward movement of the right flap 14 will be displaced clockwise to the same degree, under the assumed conditions. These opposite displacements of the resultant flux vectors create a resultant torque which is effective to move the rotor 82 in a counterclockwise direction to a position where the pointer 108 indicates the average position of the flaps 12 and 14 below the neutral position 112. Under the conditions assumed, such indication would show a five degree elevator trim in a counterclockwise direction on the scale 110, Fig. 5, showing the craft was nosing down.

While two examples of the functioning and operation of the system have been specifically described above, it will be understood that indications will be secured as respects aileron and elevator trim irrespective of the various combinations of movements of the left and right wing flaps. It will be understood, however, that regardless of the flap movements, the aileron indicator 24 will always indicate the average or mean of the differential movement between the flaps, or in other words, half the angle therebetween. Moreover, the elevator indicator 26 will always indicate the average position of the flaps above or below the neutral position. It will also be understood from what has been set forth above, and from Figs. 4 and 5 that downward movement of the flaps will result in counterclockwise motion of the pointer 108 and indicate a nose-down condition of the craft. Upward movement of the flaps on the other hand, will cause the pointer 108 to move clockwise and show a nose-up condition of the craft. Aileron trim will be indicated as a clockwise movement of the pointer 64 showing right wing down, or a counterclockwise movement of the pointer showing left wing down, depending upon whether the right flap is above or below the left flap.

While one embodiment of the invention has been disclosed herein, it will be readily understood that the same is not limited thereto, but is capable of receiving a variety of expressions, as well understood by those skilled in the art, without departing from the spirit of the invention. Reference will therefore be had to the appended claims for a definition of the limits of the invention.

What is claimed is:

1. An indicating system for the two wing flaps of an aircraft comprising means for translating the movements of said flaps from a neutral position into electrical signals, means for combining said signals to indicate the average of the differential movement between the flaps, and other means to derive from said signals, an indication of the average position of the flaps above or below the neutral position.

2. An indicating system for the two wing flaps of an aircraft comprising means for translating the movements of said flaps from a neutral position into electrical signals, an aileron indicator, means for combining said signals, means for actuating said indicator in accordance with said combined signal whereby said indicator shows half the angle between the flaps, an elevator indicator, other means for combining said signals, and means for actuating the elevator indicator in accordance with the last-named combined signal whereby the elevator indicator shows the average position of the flaps above or below the neutral position.

3. An indicating system for the two wing flaps of an aircraft comprising an electrical transmitter operatively connected with one flap, a second electrical transmitter operatively connected with the other flap, means including an inductive device having relatively movable elements for interconnecting said transmitters, one of said elements being movable to indicate the average of the differential movement between said members, and electrical means connected with said transmitter for indicating the average position of said members upon either side of a neutral position.

4. An indicating system as defined in claim 3 wherein the electrical means includes an inductive device comprising relatively movable elements.

5. An indicating system for the two wing flaps of an aircraft comprising an electrical transmitter operatively connected with one flap, a second electrical transmitter operatively connected with the other flap, each of said transmitters comprising a wound rotor and a wound stator, an indicator comprising inductively associated wound rotor and wound stator elements respectively connected with the stators of said transmitters and arranged to indicate the average of the differential movement between said members, and electrical means associated with the stators of said transmitters for indicating the average position of said members upon either side of a neutral position.

6. An indicating system as defined in claim 5 wherein the electrical means includes inductively associated wound rotor and wound stator elements.

7. An indicating system as set forth in claim 5 wherein the electrical means includes a wound stator connected in reverse phase relation with one of said transmitter stators, and a wound rotor connected in similar phase relation with the other transmitter stator.

8. An indicating system for the two wing flaps of an aircraft comprising an electrical transmitter operatively connected with one flap, a second electrical transmitter operatively connected with the other flap, each of said transmitters comprising a single phase rotor winding and a three phase stator winding, a remotely positioned three phase stator winding connected in similar phase relation with one of said transmitter stator windings, a remotely positioned three phase rotor winding inductively associated with the remotely positioned stator winding, and connected in similar phase relation with the other transmitter stator winding, said three phase rotor winding being provided with means for indicating the average of the differential movement between said members in accordance with the operation of said transmitters, other remotely positioned three phase stator and rotor windings respectively connected with the transmitter stator windings, one of the said other windings being connected in reverse phase relation, and both of said other windings being inductively associated, and means operatively connected with the said other remotely positioned rotor winding for indicating the average position of said members upon either side of a neutral position.

PAUL F. BECHBERGER.

REFERENCES CITED

The following references are of record in the file of this patent:

UNITED STATES PATENTS

| Number | Name | Date |
| --- | --- | --- |
| 706,554 | Hall | Aug. 12, 1902 |
| 1,628,463 | Hewelett et al. | May 10, 1927 |
| 1,655,244 | Rowell | Jan. 3, 1928 |
| 1,684,137 | Mittag | Sept 11, 1928 |
| 1,732,987 | Rowell | Oct. 22, 1929 |
| 2,389,449 | Middel | Nov. 20, 1945 |

OTHER REFERENCES

General Electric Review, Sept. 1930, vol. 33, No. 9, pages 500–504 inc., article entitled "Principles of Selsyn Equipments and their Operation." (Copy in the Scientific Library, U. S. Patent Office).

General Electric Review, Dec. 1944, pages 40–44 inc. Article, Position Control. (Copy in 172–239 (868) Pub.)